United States Patent
Li et al.

(10) Patent No.: US 9,588,288 B2
(45) Date of Patent: Mar. 7, 2017

(54) BACKLIGHT MODULE AND LIQUID CRYSTAL DISPLAY DEVICE USING SAME

(71) Applicant: Shenzhen China Star Optoelectronics Technology Co., Ltd., Shenzhen, Guangdong (CN)

(72) Inventors: Dehua Li, Shenzhen (CN); Shihhsiang Chen, Shenzhen (CN); Liyi Chen, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 451 days.

(21) Appl. No.: 13/807,381

(22) PCT Filed: Dec. 4, 2012

(86) PCT No.: PCT/CN2012/085779
§ 371 (c)(1),
(2) Date: Dec. 28, 2012

(87) PCT Pub. No.: WO2014/079104
PCT Pub. Date: May 30, 2014

(65) Prior Publication Data
US 2014/0146268 A1    May 29, 2014

(30) Foreign Application Priority Data

Nov. 23, 2012 (CN) .......................... 2012 1 0483137

(51) Int. Cl.
*G02F 1/1333* (2006.01)
*G02B 6/04* (2006.01)
(Continued)

(52) U.S. Cl.
CPC ............ *G02B 6/04* (2013.01); *G02B 6/0028* (2013.01); *G02F 1/133308* (2013.01); *G02F 1/133615* (2013.01); *G02F 2001/133314* (2013.01)

(58) Field of Classification Search
CPC ......... G02F 1/133608; G02F 1/133602; G02F 1/133606; G02F 1/2252; G02F 1/225;
(Continued)

(56) References Cited

U.S. PATENT DOCUMENTS 5,226,105 A * 7/1993 Myers .................... G02B 6/001
358/901.1
6,655,809 B2 * 12/2003 Suzuki .............. G02F 1/133615
362/23.15
(Continued)

FOREIGN PATENT DOCUMENTS

CN        102073166 A    5/2011
JP       2000231816 A    8/2000
(Continued)

*Primary Examiner* — Kendrick Hsu
(74) *Attorney, Agent, or Firm* — Andrew C. Cheng

(57) ABSTRACT

The present invention provides a backlight module and a liquid crystal display device using the backlight module. The backlight module includes a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers. Each of the first optical fiber splitters includes a first light inlet and a plurality of first light outlets. The first light inlets are respectively connected to the first optical fibers and the first light outlets are respectively connected to the second optic fibers. The backlight module uses optic fiber splitters to split received sun light for making (Continued)

dense and uniform distribution of sun light at a light incidence site of a light guide plate.

7 Claims, 4 Drawing Sheets

(51) Int. Cl.
*G02F 1/1335* (2006.01)
*F21V 8/00* (2006.01)
(58) Field of Classification Search
CPC ... G02F 1/133524; G02F 2001/133314; G02F 1/13308; G02F 1/133615; G02B 6/04; G02B 6/0028
See application file for complete search history.

(56) References Cited

U.S. PATENT DOCUMENTS

2009/0322985 A1* 12/2009 Mizuuchi ................... 349/62
2012/0257136 A1* 10/2012 Horiuchi ................... 349/58

FOREIGN PATENT DOCUMENTS

| JP | 2005091494 A | 4/2005 |
| TW | 201232035 A | 8/2012 |

* cited by examiner

BACKLIGHT MODULE AND LIQUID CRYSTAL DISPLAY DEVICE USING SAME

BACKGROUND OF THE INVENTION

1. Field of the Invention

The present invention relates to the field of liquid crystal displaying, and in particular to a backlight module and a liquid crystal display device using the backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and the liquid crystal molecules are controlled to change direction by application of electricity to the glass substrates in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlight source, such as an LED light bar, arranged at an edge of a backplane to be located rearward of one side of the liquid crystal panel. The LED light bar emits light that enters an optic film assembly through a light incident face of the optic film assembly and is projected out of a light emergence face of the optic film assembly, after being reflected and diffused, to thereby form a planar light source for the liquid crystal panel.

In the conventional light source, LED or CCFL emits white light by mixing lights emitting from fluorescent powders, which renders color gamut narrow and color reproducibility poor, making it not able to restore the true color of an object. Thus, a new backlighting mode is proposed, which uses sun light that has the most complete color gamut and the strongest color reproducibility to serve as backlight source. Optic fibers are employed to conduct sun light to the backlight system to provide backlighting to a liquid crystal panel, making the screen of the liquid crystal panel more vivid and having stronger color integrity. In addition, sun light also meets the current trend of environmental protection.

As shown in FIGS. 1 and 2, which are schematic views showing a backlight module and a liquid crystal display device using sun light as backlight source, the liquid crystal display device comprises a back panel 100, a light guide plate 300 arranged in the back panel 100, an optic fiber substrate 500 arranged at the side of light incidence surface of the light guide plate 300, a plurality of optic fibers 700 connected to the optic fiber substrate 500, an intermediate frame 800 mounted on the back panel 100, and a liquid crystal display panel 900 positioned on the intermediate frame 800. The optic fibers 700 each have an end connected to the optic fiber substrate 500 and an opposite end connected to sun light collector (not shown). The sun light collector collects sun light and transmits the sun light through the optic fibers 700 to the optic fiber substrate 500 to allow the sun light to enter the light guide plate 300 from the light incidence surface of the light guide plate 300 and emerges from a light emergence surface of the light guide plate 300 to provide a uniformly distributed planar light source to the liquid crystal display panel 900. After entering the light guide plate 300, the light must travel a distance for light mixing. However, when a small number of optic fibers 700 are used, the light mixing distance must be extended, otherwise the so-called firebug effect may occur at the light incidence side, showing a plurality of light spots. However, increasing the light mixing distance needs to increase the thickness of the bezel and this affects the outside appearance of the liquid crystal display device. Using a large number of optic fibers 700 would overcome the problem of firebug effect, but the increased number of optic fibers 700 between the light collector and the light incidence site would increase the cost, making it disadvantageous for cost control.

SUMMARY OF THE INVENTION

An object of the present invention is to provide a backlight module, which uses sun light as a backlight source to effectively reduce the manufacture cost and provide homogeneous illumination and effectively overcome the firebug effect.

Another object of the present invention is to provide a liquid crystal display device, which has a wide gamut, effectively improves quality of color of image, and has a simple structure and low cost, so as to facilitate cost control.

To achieve the objects, the present invention provides a backlight module, which comprises a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers. Each of the first optical fiber splitters comprises a first light inlet and a plurality of first light outlets. The first light inlets are respectively connected to the first optical fibers. The first light outlets are respectively connected to the second optic fibers.

The backlight module further comprises a plurality of second optic fiber splitters connected to the ends of the second optic fibers that are distant from the first optical fiber splitters and a plurality of third optic fibers connected to the second optic fiber splitters. Each of the second optic fiber splitters comprises a second light inlet and a plurality of second light outlets. The second light inlets are respectively connected to the second optic fibers. The second light outlets are respectively connected to the third optic fibers. The light guide plate is arranged at the side of the third optic fibers that is distant from the second optic fiber splitters.

The backlight module further comprises a backplane and an optic fiber substrate arranged inside the backplane. The backplane comprises a bottom board and a side board connected to the bottom board. The light guide plate has a bottom surface, a top surface opposite to the bottom surface, and a plurality of side surfaces connecting between the bottom surface and the top surface. The plurality of side surfaces includes at least one light incidence surface. The optic fiber substrate is arranged inward of the side board of the backplane to correspond to the light incidence surface. The optic fiber substrate functions to fix the second optic fibers.

The backlight module further comprises a backplane and an optic fiber substrate arranged inside the backplane. The backplane comprises a bottom board and a side board connected to the bottom board. The light guide plate has a bottom surface, a top surface opposite to the bottom surface, and a plurality of side surfaces connecting between the bottom surface and the top surface. The plurality of side surfaces includes at least one light incidence surface. The optic fiber substrate is arranged inward of the side board of the backplane to correspond to the light incidence surface. The optic fiber substrate functions to fix the third optic fibers.

The first optical fiber splitters and the second optic fiber splitters are each formed of at least two optic fibers subjected to side splicing and tapering.

The present invention also provides a backlight module, which comprises a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers, each of the first optical fiber splitters comprising a first light inlet and a plurality of first light outlets, the first light inlets being respectively connected to the first optical fibers, the first light outlets being respectively connected to the second optic fibers;

further comprising a plurality of second optic fiber splitters connected to the ends of the second optic fibers that are distant from the first optical fiber splitters and a plurality of third optic fibers connected to the second optic fiber splitters, each of the second optic fiber splitters comprising a second light inlet and a plurality of second light outlets, the second light inlets being respectively connected to the second optic fibers, the second light outlets being respectively connected to the third optic fibers, the light guide plate being arranged at the side of the third optic fibers that is distant from the second optic fiber splitters;

further comprising a backplane and an optic fiber substrate arranged inside the backplane, the backplane comprising a bottom board and a side board connected to the bottom board, the light guide plate having a bottom surface, a top surface opposite to the bottom surface, and a plurality of side surfaces connecting between the bottom surface and the top surface, the plurality of side surfaces including at least one light incidence surface, the optic fiber substrate being arranged inward of the side board of the backplane to correspond to the light incidence surface, the optic fiber substrate functioning to fix the third optic fibers; and wherein the first optical fiber splitters and the second optic fiber splitters are each formed of at least two optic fibers subjected to side splicing and tapering.

The present invention further provides a liquid crystal display device, which comprises a backlight module, a mold frame arranged on the backlight module, a liquid crystal display panel arranged on the mold frame, and a front bezel arranged on the liquid crystal display panel. The backlight module comprises a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers. Each of the first optical fiber splitters comprises a first light inlet and a plurality of first light outlets. The first light inlets are respectively connected to the first optical fibers. The first light outlets are respectively connected to the second optic fibers.

The liquid crystal display device further comprises a plurality of second optic fiber splitters connected to the ends of the second optic fibers that are distant from the first optical fiber splitters and a plurality of third optic fibers connected to the second optic fiber splitters. Each of the second optic fiber splitters comprises a second light inlet and a plurality of second light outlets. The second light inlets are respectively connected to the second optic fibers. The second light outlets are respectively connected to the third optic fibers. The light guide plate is arranged at the side of the third optic fibers that is distant from the second optic fiber splitters.

The liquid crystal display device further comprises a backplane and an optic fiber substrate arranged inside the backplane. The backplane comprises a bottom board and a side board connected to the bottom board. The light guide plate has a bottom surface, a top surface opposite to the bottom surface, and a plurality of side surfaces connecting between the bottom surface and the top surface. The plurality of side surfaces includes at least one light incidence surface. The optic fiber substrate is arranged inward of the side board of the backplane to correspond to the light incidence surface. The optic fiber substrate functions to fix the second optic fibers.

The liquid crystal display device further comprises a backplane and an optic fiber substrate arranged inside the backplane. The backplane comprises a bottom board and a side board connected to the bottom board. The light guide plate has a bottom surface, a top surface opposite to the bottom surface, and a plurality of side surfaces connecting between the bottom surface and the top surface. The plurality of side surfaces includes at least one light incidence surface. The optic fiber substrate is arranged inward of the side board of the backplane to correspond to the light incidence surface. The optic fiber substrate functions to fix the third optic fibers.

The first optical fiber splitters and the second optic fiber splitters are each formed of at least two optic fibers subjected to side splicing and tapering.

The efficacy of the present invention is that the present invention provides a backlight module and a liquid crystal display device using the backlight module, which use sun light as a backlight source and comprises optic fiber splitters to split the sun light so as to make the sun light distributed densely and uniformly at light incidence site of the light guide plate, in which optic fibers of great length are used with a small quantity so as to overcome the issue of firebug effect to provide improve color quality to image and also to reduce the amount of optic fibers used to reduce the cost and enable the use of narrowed frame to provide a good-looking appearance.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
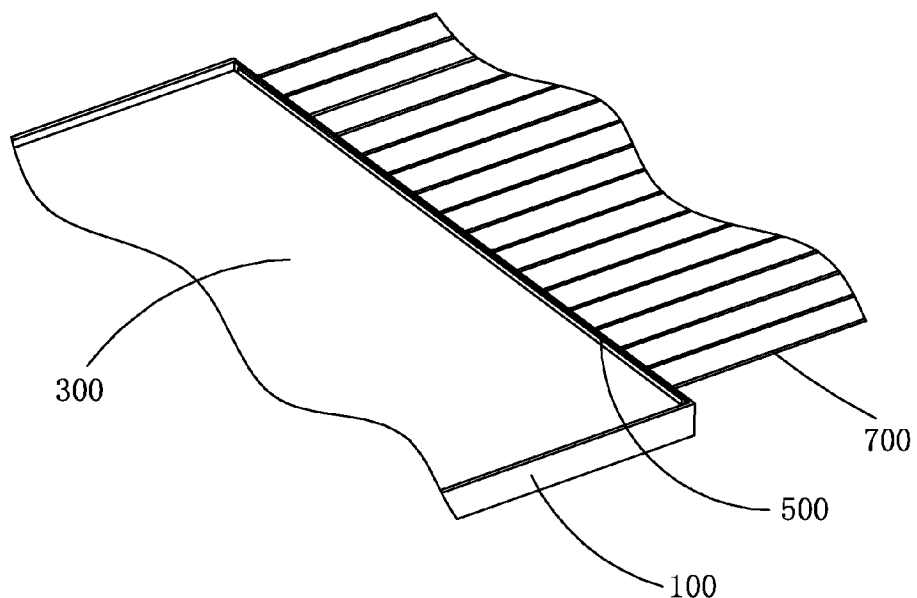
FIG. 1 is a schematic view showing the structure of a conventional backlight module that uses sun light as a backlight source.
Figure 2:
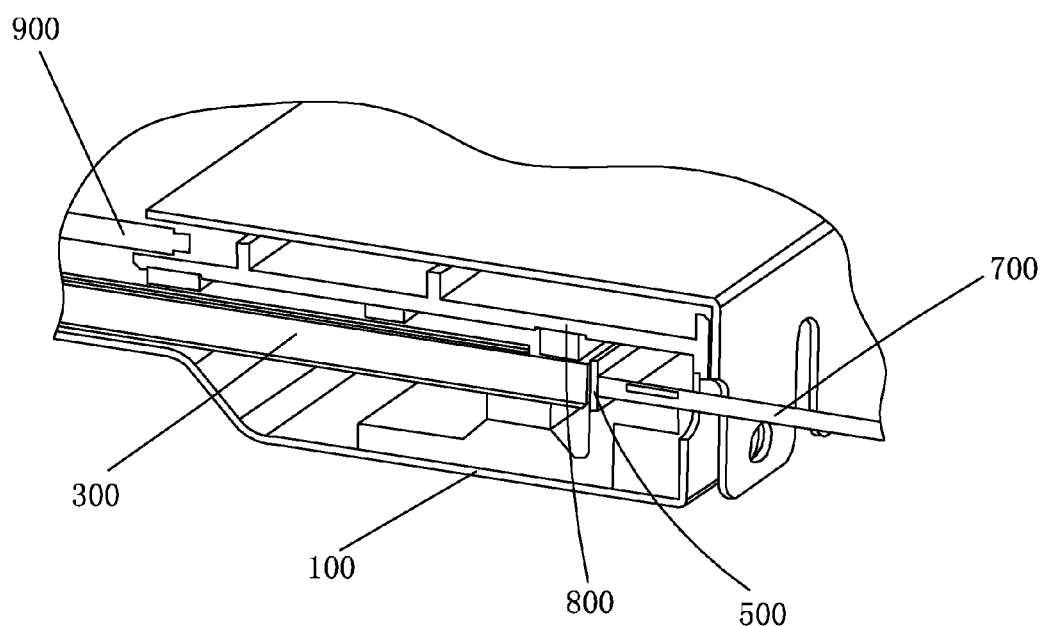
FIG. 2 is a schematic view showing the structure of a liquid crystal display device that uses sun light as a backlight source.
Figure 3:
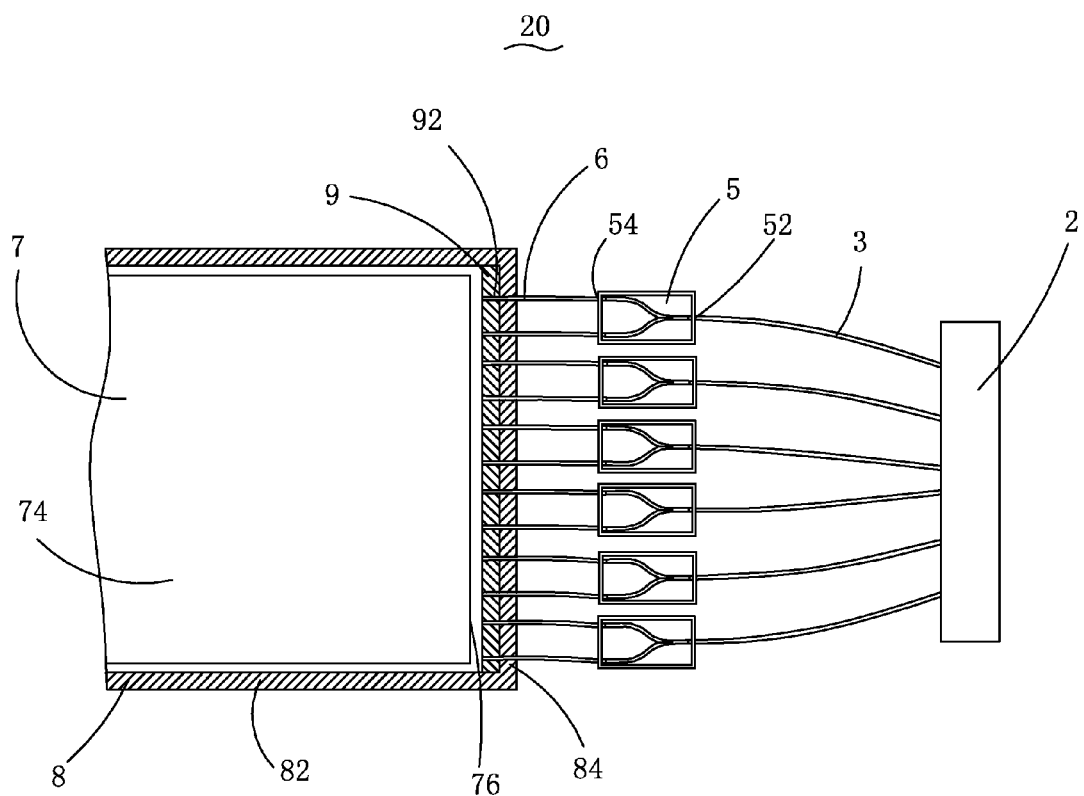
FIG. 3 is a schematic view showing the structure of a backlight module according to an embodiment of the present invention.
Figure 4:
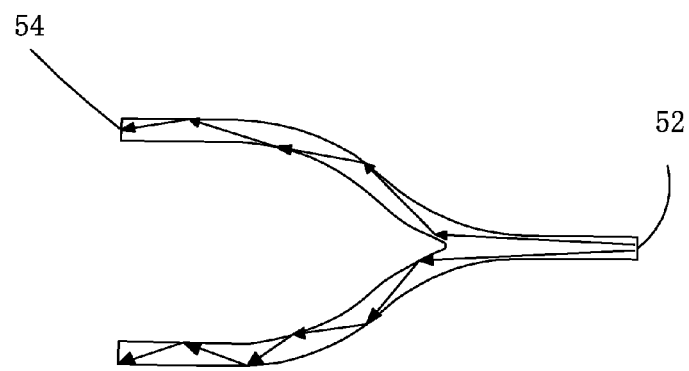
FIG. 4 is a schematic view showing the principle of optical path of the backlight module according to the present invention.

Referring to FIGS. 3 and 4, the present invention provides a backlight module 20, which comprises a light collector 2, a plurality of first optical fibers 3 connected to the light collector 2, a plurality of first optical fiber splitters 5 connected to the first optical fibers 3, a plurality of second optic fibers 6 connected to the first optical fiber splitters 5, and a light guide plate 7 arranged at one side of the second optic fibers 6. Each of the first optical fiber splitters 5 comprises a first light inlet 52 and a plurality of first light outlets 54. The first light inlets 52 are respectively connected to the first optical fibers 3. The first light outlets 54 are respectively connected to the second optic fibers 6. The light collector 2 receives and collects sun light and transmits the sun light through the first optical fibers 3 to the first optical fiber splitters 5. The first optical fiber splitters 5 split the sun light into a plurality of sun light beams. The plurality of sun light beams are transmitted through the second optic fibers 6 to the light guide plate 7 to form a backlight module 20 of uniform illumination.

The backlight module 20 further comprises a backplane 8 and an optic fiber substrate 9 arranged inside the backplane 8. The backplane 8 comprises a bottom board 82 and a side board 84 connected to the bottom board 82. The light guide plate 7 has a bottom surface (not shown), a top surface 74 opposite to the bottom surface, and a plurality of side surfaces connecting between the bottom surface and the top surface 74. The plurality of side surfaces includes at least one light incidence surface 76. The optic fiber substrate 9 is arranged inward of the side board 8 of the backplane 8 to correspond to the light incidence surface 76.

In the instant embodiment, the optic fiber substrate 9 functions to fix the second optic fibers 6. Preferably, the optic fiber substrate 9 forms a plurality of holes 92 respectively corresponding to the plurality of second optic fibers 6, whereby the second optic fibers 6 are respectively receivable in the plurality of holes 92. The second optic fibers 6 each have an end face opposing the light incidence surface 76 of the light guide plate 7. The sun light collected by the light collector 2 is transmitted through the first optical fibers 3 to the first optical fiber splitters 5 and the first optical fiber splitters 5 splits the sun light into a plurality of sun light beams. The plurality of sun light beams are projected out of the end faces of the second optic fibers 6 to enter the light guide plate 7 through the light incidence surface 76 of the light guide plate 7 so as to provide a planar light source of homogeneous illumination.

The first optical fiber splitters 5 are each formed of two optical fibers subjected to side splicing and tapering. The operation is simple and easy and the cost is low and effective splitting of light beam can be achieved.

In the instant embodiment, the first optical fibers 3 can be of a relatively great length and a relatively small number in order to control the manufacture cost. The second optic fibers 6 can be of a relatively small length and a number determined by the brightness and homogeneity of illumination of the backlight module 20, making it flexible and versatile and having practical utilization to effectively overcome the problem of firebug effect.

Figure 5:
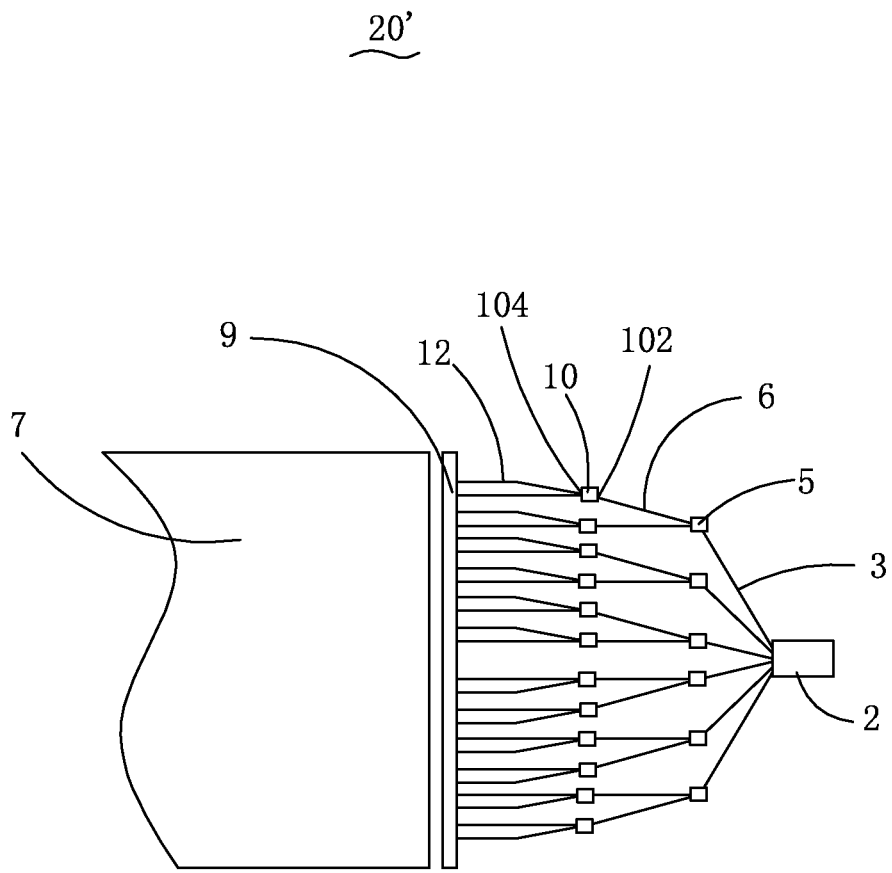
FIG. 5 is a schematic view showing the structure of a backlight module according to another embodiment of the present invention.

Referring to FIG. 5, which is a schematic view showing the structure of a backlight module according to another embodiment of the present invention, in the instant embodiment, the backlight module 20' further comprises a plurality of second optic fiber splitters 10 connected to the ends of the second optic fibers 6 that are distant from the first optical fiber splitters 5 and a plurality of third optic fibers 12 connected to the second optic fiber splitters 10. Each of the second optic fiber splitters 10 comprises a second light inlet 102 and a plurality of second light outlets 104. The second light inlets 102 are respectively connected to the second optic fibers 6. The second light outlets 104 are respectively connected to the third optic fibers 12. The light guide plate 7 is arranged at the side of the third optic fibers 12 that is distant from the second optic fiber splitters 10. The second optic fiber splitters 10 are each formed of two optical fibers subjected to side splicing and tapering.

In the instant embodiment, the optic fiber substrate 9 functions to fix the third optic fibers 12 and the structure and technical result are identical to the previous embodiment so that repeated description will be omitted herein.

In the instant embodiment, the first optical fibers 3 can be of a length that is the greatest and number is the minimum in order to control the manufacture cost. The second optic fibers 6 can be of a length that is shorter than that of the first optical fibers 3 and the number is larger than that of the first optical fibers 3 in order to improve the result of light splitting and thus improving the homogeneity of illumination of the backlight module 20' and eliminating the firebug effect. The third optic fibers 12 can be of the shortest length and the largest number to further improve the homogeneity of illumination of the backlight module 20' and eliminating the firebug effect.

Figure 6:
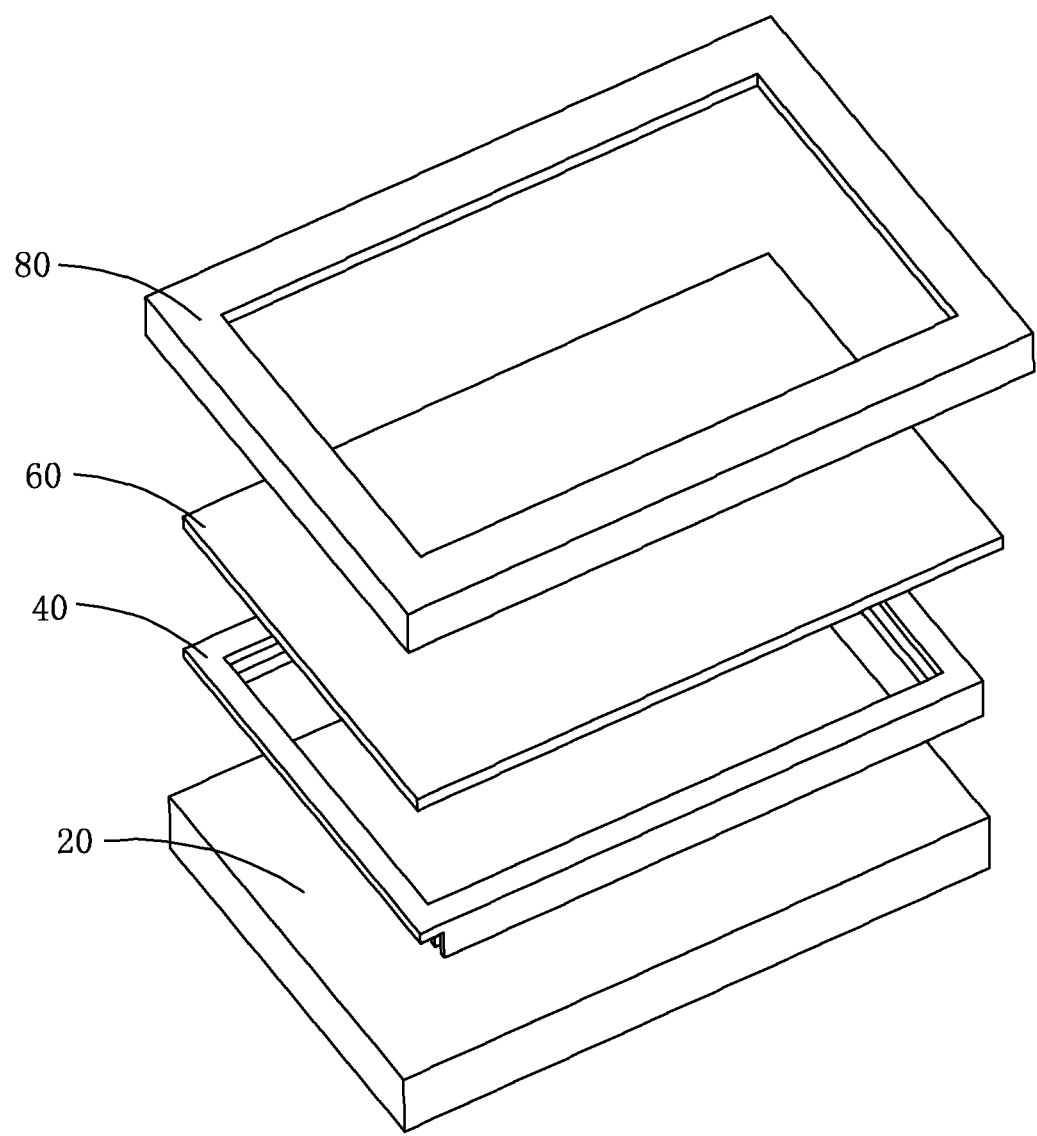
FIG. 6 is an exploded view showing a liquid crystal display device according to the present invention.

Referring to FIGS. 6 and 3, the present invention also provides a liquid crystal display device, which comprises a backlight module 20, a mold frame 40 arranged on the backlight module 20, a liquid crystal display panel 60 arranged on the mold frame 40, and a front bezel 80 arranged on the liquid crystal display panel 60. The backlight module 20 provides a planar light source of improved homogeneity of illumination to the liquid crystal display panel 60 in order to enable the liquid crystal display panel 60 to display image. The mold frame 40 supports and protects the liquid crystal display panel 60. The front bezel 80 retains the liquid crystal display panel 60 in the mold frame 40.

The backlight module 20 comprises a light collector 2, a plurality of first optical fibers 3 connected to the light collector 2, a plurality of first optical fiber splitters 5 connected to the first optical fibers 3, a plurality of second optic fibers 6 connected to the first optical fiber splitters 5, and a light guide plate 7 arranged at one side of the second optic fibers 6. Each of the first optical fiber splitters 5 comprises a first light inlet 52 and a plurality of first light outlets 54. The first light inlets 52 are respectively connected to the first optical fibers 3. The first light outlets 54 are respectively connected to the second optic fibers 6. The light collector 2 receives and collects sun light and transmits the sun light through the first optical fibers 3 to the first optical fiber splitters 5. The first optical fiber splitters 5 split the sun light into a plurality of sun light beams. The plurality of sun light beams are transmitted through the second optic fibers 6 to the light guide plate 7 to form a backlight module 20 of uniform illumination.

The backlight module 20 further comprises a backplane 8 and an optic fiber substrate 9 arranged inside the backplane 8. The backplane 8 comprises a bottom board 82 and a side board 84 connected to the bottom board 82. The light guide plate 7 has a bottom surface, a top surface 74 opposite to the bottom surface, and a plurality of side surfaces connecting between the bottom surface and the top surface 74. The plurality of side surfaces includes at least one light incidence surface 76. The optic fiber substrate 9 is arranged inward of the side board 8 of the backplane 8 to correspond to the light incidence surface 76.

In the instant embodiment, the optic fiber substrate 9 functions to fix the second optic fibers 6. Preferably, the optic fiber substrate 9 forms a plurality of holes 92 respectively corresponding to the plurality of second optic fibers 6, whereby the second optic fibers 6 are respectively receivable in the plurality of holes 92. The second optic fibers 6 each have an end face opposing the light incidence surface 76 of the light guide plate 7. The sun light collected by the light collector 2 is transmitted through the first optical fibers 3 to the first optical fiber splitters 5 and the first optical fiber splitters 5 splits the sun light into a plurality of sun light beams. The plurality of sun light beams are projected out of the end faces of the second optic fibers 6 to enter the light guide plate 7 through the light incidence surface 76 of the light guide plate 7 so as to provide a planar light source of homogeneous illumination.

The first optical fiber splitters 5 are each formed of two optical fibers subjected to side splicing and tapering. The operation is simple and easy and the cost is low and effective splitting of light beam can be achieved.

In the instant embodiment, the first optical fibers 3 can be of a relatively great length and a relatively small number in order to control the manufacture cost. The second optic fibers 6 can be of a relatively small length and a number determined by the brightness and homogeneity of illumination of the backlight module 20, making it flexible and versatile and having practical utilization to effectively overcome the problem of firebug effect.

In summary, the present invention provides a backlight module and a liquid crystal display device using the backlight module, which use sun light as a backlight source and comprises optic fiber splitters to split the sun light so as to make the sun light distributed densely and uniformly at light incidence site of the light guide plate, in which optic fibers of great length are used with a small quantity so as to overcome the issue of firebug effect to provide improve color quality to image and also to reduce the amount of optic fibers used to reduce the cost and enable the use of narrowed frame to provide a good-looking appearance.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers, each of the first optical fiber splitters comprising a first light inlet and a plurality of first light outlets and allowing light to be simultaneously transmitted from the first light inlet to the plurality of first light outlets, the first light inlets being respectively connected to the first optical fibers, the first light outlets being respectively connected to the second optic fibers;

a backplane in which the light guide plate having a light incidence surface is mounted, an optic fiber substrate being arranged in the backplane to correspond to the light incidence surface such that a first surface of the optic fiber substrate faces the light incidence surface of the light guide plate and an opposite second surface facing away from the light guide plate, the optic fiber substrate retaining ends of the second optic fibers at positions close to and facing the light incidence surface so as to allow light to be directly transmitted from the ends of the second optic fibers to the light incidence surface;

wherein the light collector is located outside the backplane, while the light guide plate is arranged inside the backplane and the light collector is connected via the first and second optic fibers that extend through the backplane to have the ends thereof respectively received in and retained by holes, which are formed in the optic fiber substrate and extend through the optic fiber substrate to be in communication with both the opposite first and second surfaces of the optic fiber substrate, to be facing and close to the light incidence surface of the light guide plate for transmitting light from the light collector to the light guide plate by allowing the light traveling through the first and second optic fibers through the backplane, wherein the light is projected from each of the ends of the optic fibers to the light incidence surface of the light guide plate.

2. The backlight module as claimed in claim 1, wherein the backplane comprises a bottom board and a side board connected to the bottom board, the light guide plate having a bottom surface, a top surface opposite to the bottom surface, and a plurality of side surfaces connecting between the bottom surface and the top surface, the plurality of side surfaces including the light incidence surface, the optic fiber substrate being arranged inward of the side board of the backplane to correspond to the light incidence surface.

3. The backlight module as claimed in claim 1, wherein the first optical fiber splitters are each formed of at least two optic fibers subjected to side splicing and tapering.

4. A backlight module, comprising a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers, each of the first optical fiber splitters comprising a first light inlet and a plurality of first light outlets and allowing light to be simultaneously transmitted from the first light inlet to the plurality of first light outlets, the first light inlets being respectively connected to the first optical fibers, the first light outlets being respectively connected to the second optic fibers;

further comprising a plurality of second optic fiber splitters connected to the ends of the second optic fibers that are distant from the first optical fiber splitters and a plurality of third optic fibers connected to the second optic fiber splitters, each of the second optic fiber splitters comprising a second light inlet and a plurality of second light outlets and allowing light to be simultaneously transmitted from the second light inlet to the plurality of second light outlets, the second light inlets being respectively connected to the second optic fibers, the second light outlets being respectively connected to the third optic fibers, the light guide plate being arranged at the side of the third optic fibers that is distant from the second optic fiber splitters;

further comprising a backplane in which the light guide plate is mounted and an optic fiber substrate arranged inside the backplane, the backplane comprising a bottom board and a side board connected to the bottom board, the light guide plate having a bottom surface, a top surface opposite to the bottom surface, and a plurality of side surfaces connecting between the bottom surface and the top surface, the plurality of side surfaces including at least one light incidence surface, the optic fiber substrate being arranged inward of the side board of the backplane to correspond to the light incidence surface such that a first surface of the optic fiber substrate faces the light incidence surface of the light guide plate and an opposite second surface facing away from the light guide plate, the optic fiber substrate retaining ends of the third optic fibers at positions close to and facing the light incidence surface so as to allow light to be directly transmitted from the ends of the second optic fibers to the light incidence surface; and wherein the first optical fiber splitters and the second optic fiber splitters are each formed of at least two optic fibers subjected to side splicing and tapering;

wherein the light collector is located outside the backplane, while the light guide plate is arranged inside the backplane and the light collector is connected via the first, second, and third optic fibers that extend through the backplane to have the ends thereof respectively received in and retained by holes, which are formed in the optic fiber substrate and extend through the optic fiber substrate to be in communication with both the opposite first and second surfaces of the optic fiber substrate, to be facing and close to the light incidence surface of the light guide plate for transmitting light from the light collector to the light guide plate by allowing the light traveling through the first, second, and third optic fibers through the backplane, wherein the light is projected from each of the ends of the optic fibers to the light incidence surface of the light guide plate.

5. A liquid crystal display device, comprising a backlight module, a mold frame arranged on the backlight module, a liquid crystal display panel arranged on the mold frame, and a front bezel arranged on the liquid crystal display panel, the backlight module comprising a light collector, a plurality of first optical fibers connected to the light collector, a plurality of first optical fiber splitters connected to the first optical fibers, a plurality of second optic fibers connected to the first optical fiber splitters, and a light guide plate arranged at one side of the second optic fibers, each of the first optical fiber splitters comprising a first light inlet and a plurality of first light outlets and allowing light to be simultaneously transmitted from the first light inlet to the plurality of first light outlets, the first light inlets being respectively connected to the first optical fibers, the first light outlets being respectively connected to the second optic fibers;

a backplane in which the light guide plate having a light incidence surface is mounted, an optic fiber substrate being arranged in the backplane to correspond to the light incidence surface such that a first surface of the optic fiber substrate faces the light incidence surface of the light guide plate and an opposite second surface facing away from the light guide plate, the optic fiber substrate retaining ends of the second optic fibers at positions close to and facing the light incidence surface so as to allow light to be directly transmitted from the ends of the second optic fibers to the light incidence surface;

wherein the light collector is located outside the backplane, while the light guide plate is arranged inside the backplane and the light collector is connected via the first and second optic fibers that extend through the backplane to have the ends thereof respectively received in and retained by holes, which are formed in the optic fiber substrate and extend through the optic fiber substrate to be in communication with both the opposite first and second surfaces of the optic fiber substrate, to be facing and close to the light incidence surface of the light guide plate for transmitting light from the light collector to the light guide plate by allowing the light traveling through the first and second optic fibers through the backplane, wherein the light is projected from each of the ends of the optic fibers to the light incidence surface of the light guide plate.

6. The liquid crystal display device as claimed in claim 5, wherein the backplane comprises a bottom board and a side board connected to the bottom board, the light guide plate having a bottom surface, a top surface opposite to the bottom surface, and a plurality of side surfaces connecting between the bottom surface and the top surface, the plurality of side surfaces including the light incidence surface, the optic fiber substrate being arranged inward of the side board of the backplane to correspond to the light incidence surfaces.

7. The liquid crystal display device as claimed in claim 5, wherein the first optical fiber splitters are each formed of at least two optic fibers subjected to side splicing and tapering.

* * * * *